United States Patent [19]

Kappes et al.

[11] Patent Number: 5,336,716
[45] Date of Patent: Aug. 9, 1994

[54] PAINTS, AND USE OF THE PAINTS FOR THE FINISHING OF AUTOMOBILE BODIES

[75] Inventors: Elisabeth Kappes, Mannheim; Ulrich Poth, Münster, both of Fed. Rep. of Germany

[73] Assignee: BASF Lacke + Farben Aktiengesellschaft, Munster, Fed. Rep. of Germany

[21] Appl. No.: 958,337

[22] PCT Filed: Jun. 21, 1991

[86] PCT No.: PCT/EP91/01151
§ 371 Date: Feb. 25, 1993
§ 102(e) Date: Feb. 25, 1993

[87] PCT Pub. No.: WO92/01025
PCT Pub. Date: Jan. 23, 1992

[30] Foreign Application Priority Data

Jul. 3, 1990 [DE] Fed. Rep. of Germany ....... 4021126

[51] Int. Cl.$^5$ .............................................. C08L 67/06
[52] U.S. Cl. ............................................ 525/23; 525/30; 525/920; 525/921; 525/922; 427/421
[58] Field of Search ................... 523/415; 525/23, 30, 525/920, 921, 922; 427/421

[56] References Cited

U.S. PATENT DOCUMENTS 3,558,563  1/1971  Cunningham ........................ 525/30

FOREIGN PATENT DOCUMENTS 2014159  8/1979  United Kingdom .

Primary Examiner—Melvyn J. Marquis
Assistant Examiner—D. Aylward
Attorney, Agent, or Firm—Anne Gerry Sabourin

[57] ABSTRACT

The invention relates to paints comprising
(i) a resin (A) which contains hydroxyl groups and α,β-unsaturated carbonyl groups or a mixture of such resins, and/or
(ii) a mixture consisting of
  a) a hydroxyl-containing resin (B) or a mixture of such resins and
  b) a crosslinking agent (C) which contains α,β-unsaturated carbonyl groups or a mixture of such crosslinking agents and
(iii) a catalyst (D) which catalyzes the reaction of hydroxyl groups with α,β-unsaturated carbonyl groups or a mixture of such catalysts.

The invention is characterized in that the catalyst (D) is a Brönsted acid.

9 Claims, No Drawings

PAINTS, AND USE OF THE PAINTS FOR THE FINISHING OF AUTOMOBILE BODIES

The invention relates to paints comprising
(i) a resin (A) which contains hydroxyl groups and α,β-unsaturated carbonyl groups or a mixture of such resins, and/or
(ii) a mixture consisting of
  a) a hydroxyl-containing resin (B) or a mixture of such resins and
  b) a crosslinking agent (C) which contains α,β-unsaturated carbonyl groups or a mixture of such crosslinking agents and
(iii) a catalyst (D) which catalyzes the reaction of hydroxyl groups with α,β-unsaturated carbonyl groups or a mixture of such catalysts.

The invention also relates to the use of these paints for the finishing of automobile bodies.

Paints of the type described above are known (cf. DE-OS-3,843,323 and Farbe+Lack, 95 (1989) page 71). They crosslink by the addition of hydroxyl groups onto activated carbon double bonds. According to DE-OS-3,843,323 and the Farbe+Lack paper, the addition of hydroxyl groups onto activated carbon double bonds is catalyzed by basic catalysts.

The object of the present invention is to provide novel paints of the type described above which are an improvement over those of prior art. The novel paints should in particular furnish crosslinked paint films which possess good solvent resistance and good weather resistance even when energy-saving baking conditions (low baking temperatures and/or short baking times) are used.

Surprisingly, this object is achieved by the preparation of paints of the type described above which contain as the catalyst (D) a Brönsted acid or a mixture of Brönsted acids.

Compared with paints which cure in the presence of basic catalysts, the paints according to the invention are distinguished by the fact that they furnish at comparable baking times already at lower baking temperatures crosslinked paint films which possess good solvent resistance and good water resistance. Compared with paints containing basic catalysts, the advantageous paint characteristics may be achieved, surprisingly, using smaller amounts of catalyst. A further advantage of the paints according to the invention lies in the fact that they may also comprise as crosslinking agents, in addition to the crosslinking agent (C) containing α,β-unsaturated carbonyl groups, amino resins which can crosslink under conditions of acid catalysts with resins containing hydroxyl groups.

The paints according to the invention may be both organic solvent borne and aqueous.

In principle, any resin which contains both hydroxyl groups and α,β-unsaturated carbonyl groups and which can be used as paint binder, may be employed as the resin (A). Examples of these are polyacrylate, polyester, alkyd, urethane, polyether and epoxy resins containing both hydroxyl groups and α,β-unsaturated carbonyl groups. The resins may be prepared by known methods. Water-thinnable resins may be prepared by incorporating solubilizing groups (for example carboxylate groups) into the resin molecules. The number average molecular weight of the resins should expediently be between 250 and 100,000, preferably between 500 and 20,000, the α,β-unsaturated carbonyl group content should be between 0.01 and 20, preferably between 0.1 and 5, mol per kg of resin and the hydroxyl group content should be between 0.01 and 50 mol, preferably between 0.1 and 10 mol per kg of resin.

α,β-Unsaturated carbonyl groups have the formula

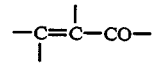

and may be, for example, acryloyl, methacryloyl, itaconoyl, maleoyl, fumaroyl, crotonoyl, cinnamoyl, acrylamido or methacrylamido groups. The hydroxyl groups should preferably be primary hydroxyl groups.

A reaction product obtained from 1 mol of N-methylolacrylamide or 1 mol of N-methylolmethacrylamide, 1 mol of a diisocyanate and a hydroxyl-containing resin is preferably used as the resin (A). Resins of this type and the preparation of these resins are described in DE-OS-3,843,323.

In principle, any hydroxyl-containing resin suitable for the preparation of paints, which contains on statistical average at least two hydroxyl groups per resin molecule, may be used as the hydroxyl-containing resin (B). Examples of these are hydroxyl-containing polyacrylate, polyester, alkyd, urethane, polyether and epoxy resins.

The resins can be prepared by known methods. Water-thinnable resins may be prepared by incorporating solubilizing groups (for example carboxylate groups) into the resin molecules. These number average molecular weight of the resins should expediently be between 250 and 100,000, preferably between 500 and 20,000, and the hydroxyl group content should be between 0.01 and 50 mol, preferably between 0.1 and 10 mol, particularly preferably between 0.9 and 3.6 mol per kg of resin. Resins containing primary hydroxyl groups should preferably be employed as the resin (B).

The hydroxyl-containing polyacrylate resins described in DE-OS-2,938,308 are preferably used as the resin (B). Polyacrylate resins containing 4-hydroxy-n-butyl acrylate and/or 4-hydroxy-n-butyl methacrylate, each present as copolymerized unit, are employed particularly preferably as the resin (B). These resins and their preparation are described in DE-OS 2,938,308. The preferred and particularly preferred polyacrylate resins under discussion should have an OH value of 50 to 200, preferably 100–200, an acid value of 0 to 80, preferably 15 to 40, a number average molecular weight of 1,000 to 30,000, preferably 2,000 to 10,000, and a glass transition temperature in the range between 250° and 370° K.

If the hydroxyl-containing resins used as the component (B) also contain carboxyl groups in addition to the hydroxyl groups, then in many cases it is possible to reduce the amount of the catalyst (D) used.

In principle, any organic compound or any resin which contains on statistical average at least two α,β-unsaturated carbonyl groups in the molecule, may be used as the crosslinking agent (C). Crosslinking agents containing on statistical average at least two $CH_2=CH-CO$ groups per molecule, are preferably used.

α,β-Unsaturated carbonyl groups have the formula

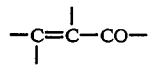

and can be, for example, acryloyl, methacryloyl, itaconoyl, maleoyl, fumaroyl, crotonoyl, cinnamoyl, acrylamido or methacrylamido groups.

Any polyacrylate, polyester, alkyd, urethane, polyether and epoxy resin containing $\alpha,\beta$-unsaturated carbonyl groups, may be used, for example, as the crosslinking agent (C). The resins can be prepared by known methods. Water-thinnable resins can be prepared by incorporating solubilizing groups (for example carboxylate groups) into the resin molecules. The number average molecular weight of the resins should expediently be between 170 and 100,000, preferably between 170 and 20,000, the $\alpha,\beta$-unsaturated carbonyl group content should be between 0.01 and 20, preferably between 0.1 and 12 mol per kg of resin.

A reaction product obtained from 1 mol of N-methylolacrylamide or 1 mol of N-methylolmethacrylamide, 1 mol of a diisocyanate and a hydroxyl-containing resin may be employed as the crosslinking agent (C).

Resins of this type and the preparation of these resins are described in DE-OS-3,843,323.

Relatively low-molecular (number average molecular weight up to about 2,000, preferably up to about 1,000) diacrylates and polyacrylates, for example ethylene glycol diacrylate, butanediol diacrylate, trimethylolpropane diacrylate, trimethylolpropane triacrylate, pentaerythritol diacrylate, pentaerythritol triacrylate, alkoxylated glycerol esterified with acrylic acid, 1,12 dodecyl diacrylate, urethane group-containing polyacrylates, for example reaction products obtained from toluylene diisocyanate, acrylic acid and pentaerythritol and reaction products obtained from isophorone diisocyanate, acrylic acid and pentaerythritol are preferably used as the crosslinking agent (C). The corresponding methacrylates may also be used. The crosslinking agents (C) preferably used expediently contain on statistical average 2 to 6 acrylate structures per molecule. The use of the relatively low-molecular crosslinking agents makes it possible to formulate paints with high solids contents.

In some cases it is advantageous also to employ in addition to the crosslinking agent (C) an amino resin which is reactive under acid catalysts conditions or a mixture of such amino resins. Etherified melamine resins are preferably used as the amino resins. Resins of this type are commercially available (for example Cymel ® 303 and Cymel ® 301, commercial products from Dyno Cyanamid, as well as Maprenal ® MF 900, a commercial product from Hoechst AG).

The components a) and b) are usually mixed in weight ratios of 99.99:0.01 to 50:50, preferably 99.9:0.1 to 70:30.

The paints according to the invention contain as the catalyst (D) a Brönsted acid or a mixture of Brönsted acids.

Brönsted acids are understood to be substances which are able to give up protons in water.

The pKa value of the first degree of dissociation of the Brönsted acids used, measured at 25° C., should preferably be below 1.0, particularly preferably below $-2.0$ (for the definition of the pKa value cf., for example, Organikum, VEB Deutscher Verlag der Wissenschaften, Berlin 1974, page 150 f).

Examples of usable Brönsted acids are the following: sulfonic acids, for example p-toluenesulfonic acid, dodecylbenzenesulfonic acid, naphthalenesulfonic acid, dinonylnaphthalenedisulfonic acid and benzenesulfonic acid. p-Toluenesulfonic acid and dodecylbenzenesulfonic acid are particularly preferably used as the catalyst (D).

0,001 to 20 parts by weight, preferably 0.001 to 10 parts by weight, particularly preferably 0.05 to 2 parts by weight, based on 100 parts by weight of the component (i) and/or (ii), of the component (D) should expediently be used.

In addition to the components (i) and/or (ii) and (iii), the paints according to the invention may of course also contain further components which are customary for paints, for example organic solvents, pigments, fillers, rheology aids, antifoams etc.

By using the components (i) and/or (ii) and (iii), a person skilled in the art is able to formulate paints for the coating of wood, metal, plastics, glass etc.

By using the components (i) and/or (ii) and (iii), a person skilled in the art is able to formulate in particular fillers, stone-chip intermediate coats, metallic paints (for one-coat finishes as well as two-coat finishes of the basecoat/clearcoat type) containing metal pigments, in particular aluminum pigments, solid-color paints and clearcoats for vehicle finishing, in particular for automobile finishing. These paints can be employed both for production line finishing and for refinishing.

The invention is elucidated in greater detail in the examples below. All parts and percentages are by weight, unless expressly stated otherwise.

1. Preparation of hydroxyl-containing resins (B)

1.1 Resin I 351 g of Shellsol A (an aromatic solvent boiling at 165°–185° C.) and 117 g of butyl acetate are heated to 140° C. in a 4 l stainless steel reaction vessel fitted with a stirrer, reflux condenser and monomer and initiator feeds. A mixture of 180 g of methyl methacrylate, 180 g of butyl methacrylate, 240 g of styrene, 360 g of 4-hydroxy-n-butyl acrylate and 4.2 g of mercaptoethanol and a solution of 25.2 g of di-tert-butyl peroxide in a mixture of 54 g of Shellsol A and 18 g of butyl acetate are added simultaneously and at a uniform rate to this solvent mixture in the course of 3 hours. The reaction temperature is kept at 140° C. When the addition of the monomer mixture and initiator solution has been concluded, polymerization is allowed to proceed for a further 3 hours. The polyacrylate resin solution obtained in this manner has a solids content of 65% by weight and a viscosity of 4.1 dPas (50% solution in butyl acetate). The polyacrylate resin has a hydroxyl number of 140, a number average molecular weight of 6,000 and a glass transition temperature of 278° K.

1.2 Resin II 663.4 g of Shellsol A (an aromatic solvent boiling at 165°–185° C.) and 221.1 g of butyl acetate are heated to 140° C. in a 4 l stainless steel reaction vessel fitted with a stirrer, reflux condenser and monomer and initiator feeds. A mixture of 342 g of methyl methacrylate, 342 g of cyclohexyl methacrylate, 456 g of styrene and 684 g of 4-hydroxy-n-butyl acrylate and a solution of 47.9 g of di-tert-butyl peroxide in a mixture of 102.6 g of Shellsol A and 34.2 g of butyl acetate are added simultaneously and at a uniform rate to this solvent mixture in the course of 3 hours. The reaction temperature is kept at 140° C. When the addition of the monomer mixture and initiator solution has been concluded, polymerization is allowed to proceed for a further 3 hours. The polyacrylate resin solution obtained in this manner has a solids content of 65% by weight and a viscosity of 6.4 dPas (50% solution in butyl acetate). The polyacrylate resin has a hydroxyl number of 140, a number average molecular weight of 6,000 and a glass transition temperature of 283° K.

1.3 Resin III 663.4 g of Shellsol A (an aromatic solvent boiling at 165°–185° C.) and 221.1 g of butyl acetate are heated to 140° C. in a 4 l stainless steel reaction vessel fitted with a stirrer, reflux condenser and monomer and initiator feeds. A mixture of 296.4 g of methyl methacrylate, 342.0 g of cyclohexyl methacrylate, 456 g of styrene, 684 g of 4-hydroxy-n-butyl acrylate and 45.6 g of acrylic acid and a solution of 47.9 g of di-tert-butyl peroxide in a mixture of 102.6 g of Shellsol A and 34.2 g of butyl acetate are added simultaneously and at a uniform rate to this solvent mixture in the course of 3 hours. The reaction temperature is kept at 140° C. When the addition of the monomer mixture and initiator solution has been concluded, polymerization is allowed to proceed for a further 3 hours. The polyacrylate resin solution obtained in this manner has a solids content of 65% by weight and a viscosity of 16.5 dPas (50% solution in butyl acetate). The polyacrylate resin has an acid number of 21, a hydroxyl number of 140, a number average molecular weight of 6,000 and a glass transition temperature of 283° K.

2. Crosslinking agents (C)

2.1 Crosslinking agent I

OTA 480, a commercial product from UCB-Chemie GmbH; propoxylated glycerol esterified with acrylic acid (34.5 mol % of acrylic acid, 17.5 mol % of glycerol and 48.0 mol % of propanediol, contains on statistical average 3 double bonds per molecule; double bond equivalent weight: 160, number average molecular weight: 480).

2.2 Crosslinking agent II

MONIGOMER PPTTA, a commercial product from Hans Rahm & Co., Zurich; alkoxylated tetrafunctional acrylic ester (pentaerythritol acrylate, double bond equivalent weight: 145).

2.3 Crosslinking agent III

EBECRYL220, a commercial product from UCB-Chemie GmbH; a hexafunctional aromatic urethane acrylate (reaction product obtained from toluylene diisocyanate, acrylic acid and pentaerythritol, double bond equivalent weight: 167, average molecular weight: 1,000).

2.4 Crosslinking agent IV

EBECRYL 1290, commercial product from UCB-Chemie GmbH; a hexafunctional aliphatic urethane acrylate (reaction product obtained from isophorone diisocyanate, acrylic acid and pentaerythritol double bond equivalent weight: 167, average molecular weight: 1,000).

3. Production of paints according to the invention

By mixing the components listed in the following Table 1 to the amounts (in parts by weight) stated in the table, paints according to the invention were produced.

TABLE 1

|  | A | B | C | D | E | F | G | H | I |
|---|---|---|---|---|---|---|---|---|---|
| Resin (B) | | | | | | | | | |
| I | 55.9 | 55.9 | 55.9 | | | | | | |
| II | | | | 55.9 | 55.9 | 55.9 | 55.9 | 55.9 | |
| III | | | | | | | | | 55.9 |
| Crosslinking agent (C) | | | | | | | | | |
| I | 14.5 | | | 14.5 | | | | 14.5 | 14.5 |
| II | | 13.0 | | | 13.0 | | | | |
| III | | | 15.2 | | | 15.2 | | | |
| IV | | | | | | | 15.2 | | |
| Catalyst (D) | | | | | | | | | |
| p-Toluenesulfonic acid monohydrate[1] | 1.5 | 1.5 | 1.5 | 1.5 | 1.5 | 1.5 | 1.5 | | 1.0 |
| Dodecylbenzene-sulfonic acid[1] | | | | | | | | 1.5 | |
| Butyl glycol acetate Baysilon ® | 5.0 | 5.0 | 5.0 | 5.0 | 5.0 | 5.0 | 5.0 | 5.0 | 5.0 |
| OL44[2] | 1.0 | 1.0 | 1.0 | 1.0 | 1.0 | 1.0 | 1.0 | 1.0 | 1.0 |
| Butyl acetate | 22.1 | 23.6 | 21.4 | 22.1 | 23.6 | 21.4 | 21.4 | 22.1 | 22.6 |

[1] 20% solution in ethyl acetate
[2] 5% solution in xylene/n-butanol (94:1)

4. Production of paints using basic catalysts (comparison examples)

The paints were produced by mixing the components listed in the following Table 2 in the amounts (parts by weight) stated in the table.

TABLE 2

|  | J | K | L | M |
|---|---|---|---|---|
| Resin (B) | | | | |
| I | 55.9 | | | |
| II | | 55.9 | 55.9 | 55.9 |
| Crosslinking agent (C) | | | | |
| I | 14.5 | | | |
| II | | 13.0 | 13.0 | 13.0 |
| Catalyst (D) | | | | |
| DBN[1] | | | 1.0 | |
| Triton B[2] | | 0.9 | | |
| Tetramethylguanidine | | | | 1.0 |

TABLE 2-continued

|  | J | K | L | M |
|---|---|---|---|---|
| Na dodecylphenolate[3] | 2.0 |  |  |  |
| Butyl glycol acetate | 5.0 | 5.0 | 5.0 | 5.0 |
| Baysilon ® OL 44[4] | 1.0 | 1.0 | 1.0 | 1.0 |
| Butyl acetate | 21.6 | 24.2 | 24.1 | 24.1 |

[1] Diazabicyclo[4.3.0]non-5-ene
[2] Benzyltrimethylammonium hyroxide (sic), 35% solution in methanol
[3] 50% solution in xylene
[4] 5% solution in xylene/n-butanol (94:1)

5. Application of paints and testing of the paint films obtained

The paints produced in sections 3 and 4 are applied to glass panels at a wet film thickness of 150 μm. The wet films produced with the paints from section 3 are baked for 30 min, at 140° C. and the wet films produced with the paints from section 4 are baked for 45 min, at 140° C. The paint films obtained in this manner are tested for their solvent resistance with methyl ethyl ketone (MEK) and are subjected to the water drop test. The results are sununarized in the following Table 3.

TABLE 3

| Paint film produced with the paint from | A | B | C | D | E | F | G | H | I | J | K | L | M |
|---|---|---|---|---|---|---|---|---|---|---|---|---|---|
| MEK double stroke test[1] | >100 | >100 | >100 | >100 | >100 | >100 | >100 | >100 | >100 | 1 | 7 | 7 | 2 |
| Result of the water drop test[2] | good | good | good | good | good | good | good | good | good | poor | poor | poor | poor |

[1] Number of double strokes perfomed using a cotton wad saturated with methyl ethyl ketone until dissolution phenomena become visible on the paint surface.
[2] Water drop test procedure: a water drop is placed on the surface of the baked paint film and removed after 1 hour. The condition of the paint film is then assessed.

We claim

1. A paint comprising at least one member selected from the group consisting of:
   (i) a resin (A) which comprises hydroxyl groups and wherein $\alpha,\beta$-unsaturated carbonyl groups have been introduced by reacting a part of the hydroxyl groups with a diisocyanate and a compound containing $\alpha,\beta$-unsaturated carbonyl groups, the content of hydroxyl groups being between 0.01 and 50 mol and the content of $\alpha,\beta$-unsaturated carbonyl groups being between 0.01 and 20 mol, per kg of resin, or a mixture of such resins, and
   (ii) a mixture comprising of
      a) a hydroxyl-containing resin (B) having a hydroxyl content of between 0.01 and 50 mol per kg of resin, or a mixture of such resins and
      b) a crosslinking agent (C) having on statistical average at least two $\alpha,\beta$-unsaturated carbonyl groups in the molecule, or a mixture of such crosslinking agents, the components a) and b) being in a weight ratio of 99.99:0.01 to 50:50, and wherein the paint further includes a catalyst (D) which catalyzes the reaction of hydroxyl groups with $\alpha,\beta$-unsaturated carbonyl groups or a mixture of such catalysts, wherein the catalyst (D) is a Brönsted acid whose pKa value of the first dissociation state, measured at 25° C., is below 1.0.

2. The paint as claimed in claim 1, wherein the resin (B) is a hydroxyl-containing polyacrylate resin.

3. The paint as claimed in claim 1, wherein the crosslinking agent (C) has on statistical average at least two $CH_2=CH-CO$ groups per molecule.

4. The paint as claimed in claim 1, which comprises, in addition to the crosslinking agent (C), an amino resin or a mixture of amino resins as crosslinking agents.

5. The paint as claimed in claim 1, wherein the pKa value of the first dissociation state of the Brönsted acid used as catalyst, measured at 25° C., is below −2.0.

6. The paint as claimed in claim 1, which comprises a sulfonic acid as catalyst.

7. The paint as claimed in claim 1, which comprises p-toluenesulfonic acid as catalyst.

8. The paint as claimed in claim 1, which comprises dodecylbenzenesulfonic acid as catalyst.

9. A process comprising applying the paint according to claim 1 to an automobile body.

* * * * *